United States Patent [19]

Sundseth

[11] Patent Number: 5,219,058

[45] Date of Patent: Jun. 15, 1993

[54] CONVEYOR BALL UNIT

[75] Inventor: Jarl Sundseth, Neuhaus, Fed. Rep. of Germany

[73] Assignee: Electro Pneumatic International GmbH, Fed. Rep. of Germany

[21] Appl. No.: 882,347

[22] Filed: May 13, 1992

[30] Foreign Application Priority Data

May 14, 1991 [DE] Fed. Rep. of Germany ....... 4115708

[51] Int. Cl.⁵ .............................................. B65G 13/00
[52] U.S. Cl. .................................. 193/35 MD; 16/26
[58] Field of Search ........... 193/35 MD, 35 SS, 35 B; 16/24, 25, 26, 27; 244/137.1, 118.1

[56] References Cited

U.S. PATENT DOCUMENTS

| | | | |
|---|---|---|---|
| 3,444,973 | 5/1969 | Nygsen | 193/35 MD |
| 3,466,697 | 9/1969 | Cain et al. | 16/26 |
| 3,739,894 | 6/1973 | Hinman | 193/35 MD |
| 4,689,847 | 9/1987 | Huber | 16/26 |
| 4,871,052 | 10/1989 | Huber | 193/35 MD |
| 5,033,601 | 7/1991 | Huber | 193/35 MD |
| 5,096,308 | 3/1992 | Sundseth | 16/26 X |

FOREIGN PATENT DOCUMENTS

| | | |
|---|---|---|
| 3507945 | 10/1986 | Fed. Rep. of Germany . |
| 3805494 | 8/1989 | Fed. Rep. of Germany . |
| 1150429 | 1/1958 | France ........................... 193/35 MD |

Primary Examiner—Robert P. Olszewski
Assistant Examiner—James R. Bidwell
Attorney, Agent, or Firm—Eckert, Seamans, Cherin & Mellott

[57] ABSTRACT

A conveyor ball unit comprises a conveyor ball mounted on a plurality of mounting balls in a mounting shell. A spring arrangement is provided to support the mounting shell resiliently in a housing and the conveyor ball is retained on the mounting balls by a retaining ring. A first holding device is provided to keep the housing substantially perpendicular to the surface of a supporting structure for the conveyor ball unit against a force acting on the conveyor ball. A second holding device is provided to hold the housing within an opening defined in the supporting structure and is located at an upper end of the housing. To simplify installation and removal of the unit in the supporting structure, the outer periphery of the second holding device is larger than that of the housing and locking elements are provided to fix the unit in the supporting structure. In addition, the second holding device is constructed so that after release of the locking elements it can be removed from the supporting structure as an independent element, thus allowing the housing with the components it contains to be removed from the opening in the supporting structure.

13 Claims, 4 Drawing Sheets

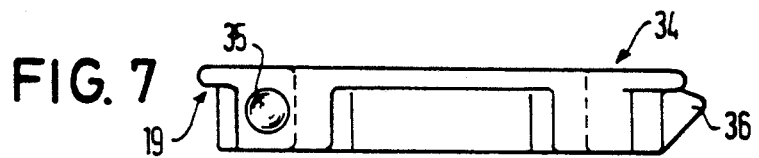
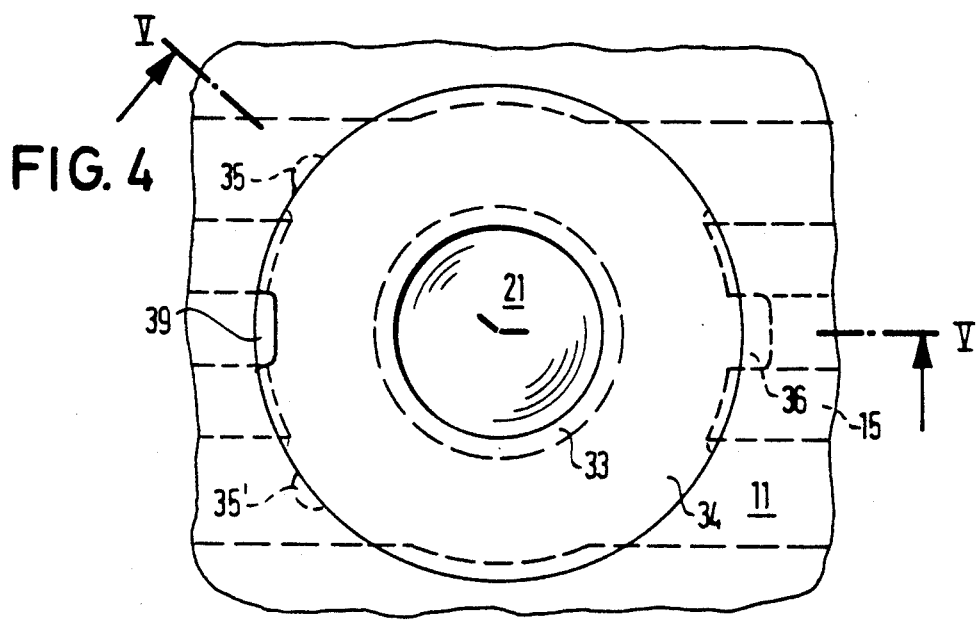
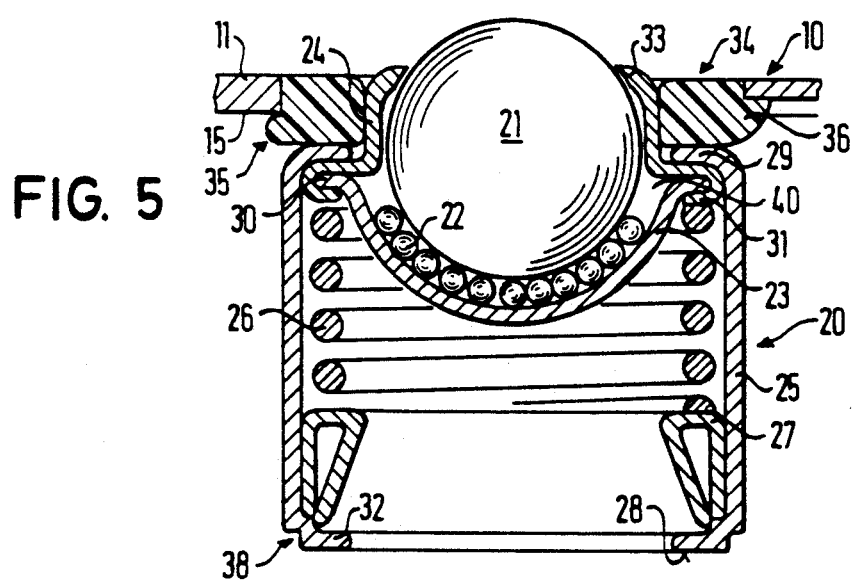
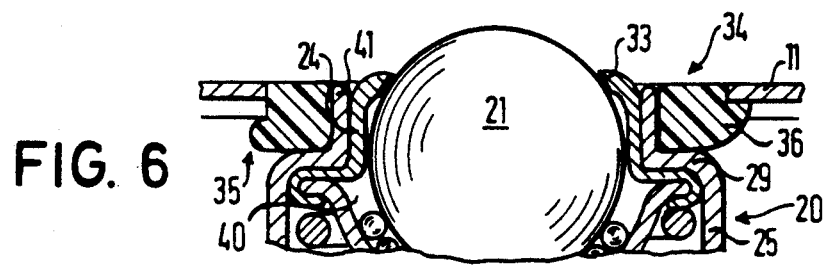

CONVEYOR BALL UNIT

FIELD OF THE INVENTION

The present invention relates to a conveyor ball unit in which a conveyor ball is supported in a mounting shell by a plurality of mounting balls.

Conveyor ball units of this type are described in German Patent DE 38 05 494 A1 and U.S. Pat. No. 3,739,894. Primarily, they are used to move freight containers in the freight compartments of aircraft during loading or unloading. Hence, apparatus for this purpose must be light but robust. Furthermore, these conveyor ball units should be as simple as possible in design to minimize their cost.

Even robust conveyor ball units can be damaged. In such cases the installed units must be removed and replaced by new ones. This Procedure must not take too long, so that the aircraft is grounded for only a short time.

However, the known conveyor units are both relatively elaborate in construction, which is inconsistent with the requirement for a low price, and laborious to install.

SUMMARY OF THE INVENTION

The object of the present invention is to provide a conveyor ball unit which is of simple construction and relatively easy to manipulate.

According to the present invention there is provided a conveyor ball unit comprising a conveyor ball; a mounting shell for the conveyor ball; a plurality of mounting balls for supporting the conveyor ball in the mounting shell; a retaining ring to keep the conveyor ball in position on the mounting balls within the mounting shell; a spring arrangement to provide a resilient support for the mounting shell; a housing for the spring arrangement; a first holding means for bracing said housing against a force acting on the conveyor ball so that said housing remains substantially perpendicular to a surface of a supporting structure for the conveyor ball unit, said first holding means being located at a lower end of said housing opposite the conveyor ball; at least one locking element to fix the conveyor ball unit in said supporting structure; and a second holding means to secure an upper portion of said housing in an opening defined by said supporting structure so that the conveyor ball can protrude above the level of said second holding means and above said surface of said supporting structure, the second holding means defining an outer periphery larger than that of said housing and being constructed so that after said locking element has been released the second holding means can be removed from the unit as an independent element enabling said housing to be removed from said opening in said supporting structure.

With this arrangement, the light and easily constructed holding means fit tightly in the assembly but can be easily removed owing to their low weight. The heavier housing, which contains the mounted conveyor ball and all other components, can then be seated in a larger opening that offers clearance, so that removal of the housing out of the supporting structure is considerably facilitated. In addition, because the first and second holding means are separately constructed and independently installed, the housing is simple to manufacture and assemble.

Preferably, the first holding means comprises a lower edge of said housing and defines a bracing surface to brace said housing against said supporting structure. Hence, owing to the combination of the bracing at the bottom of the housing with the use of the first and second holding means, the installed housing is fixed firmly, with no room for play, in the supporting structure. Preferably also in this regard the bracing surface is shaped so as to be able to form a close fit against an edge of a lower opening defined by said supporting structure.

Preferably also, the second holding means defines an inner substantially circular aperture within which the conveyor ball is held in the mounting shell by the retaining ring, the conveyor ball being movable in said circular aperture in a direction perpendicular to said surface of said supporting structure whilst being guided by said second holding means. Guidance during compression of the supporting spring is thus provided by the second holding means.

Preferably also, the retaining ring defines an upper cylindrical Portion, the outer diameter of which corresponds to the inner diameter of said inner aperture defined by the second holding means. This combination of forms ensures, by the simplest means, the above-mentioned linear guidance during displacement.

Preferably also, the locking element comprises a resiliently deformable first locking element whereby said second holding means can be snap-fitted into said opening defined by said supporting structure. The locking element is so formed that when a large enough upward force is applied, moving the housing out of the supporting structure, the locking element gives way and the holding means can be removed. Preferably also in this regard, the second holding means defines a slot near the first locking element into which a tool can be inserted to lever the second holding means out of said opening by releasing the snap engagement. A blade of a screwdriver, for example, can serve as such a tool. This feature is important in that it does not involve operation of a complicated locking mechanism, such as pushing back a bolt.

Preferably also, the second holding means comprises two first locking elements and said slot is located between them, a second locking element being provided diametrically opposite the slot at the other side of the conveyor ball and being shaped so that it can be firmly seated in said opening defined by said supporting structure. By this simple means the housing is prevented from being rotated out of position.

The retaining ring and the mounting shell are preferably formed from sheet material and joined together to form a mounting unit. A suitable way to join them is to turn a rim of the retaining ring around a rim of the mounting shell. Preferably also, the housing is also constructed from a sheet material and encloses the retaining ring with conveyor ball, mounting balls and mounting shell, which together form a functional mounting unit. This unit is held above the spring in the housing, putting the spring under tension. To keep the arrangement of the spring and the mounting unit together, it is advantageous for the space within the housing to be reduced in diameter at top and bottom, for example, by bending the housing wall inward.

BRIEF DESCRIPTION OF THE DRAWINGS

FIG. 4 is a plan view of a conveyor ball unit installed in a supporting structure;

FIG. 5 is a sectional view along the line V—V in FIG. 4;

FIG. 6 is a view similar to that of FIG. 5 but of a second embodiment of conveyor ball unit:

FIG. 7 is a side view of a holding device forming part of the embodiments shown in FIGS. 5 and 6;

DESCRIPTION OF THE PREFERRED EMBODIMENTS

In the following description the same reference numbers are used for identical components or those with identical actions in all the embodiments.

Figure 1:
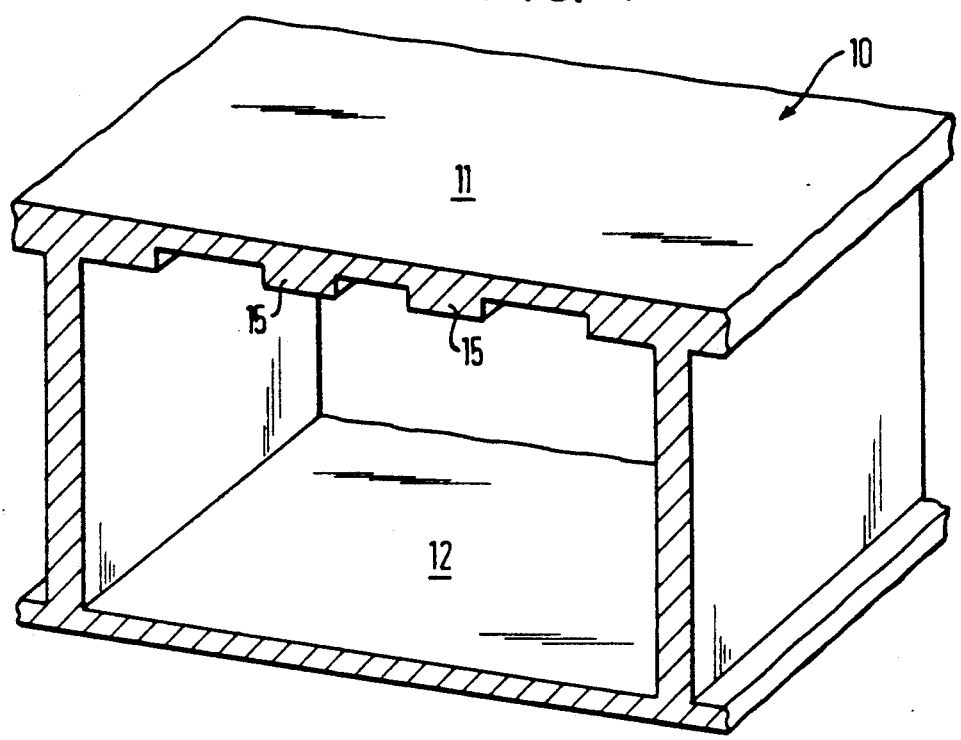
FIG. 1 is a perspective cross sectional view of a supporting structure for a conveyor ball unit according to the invention.
Figure 2:
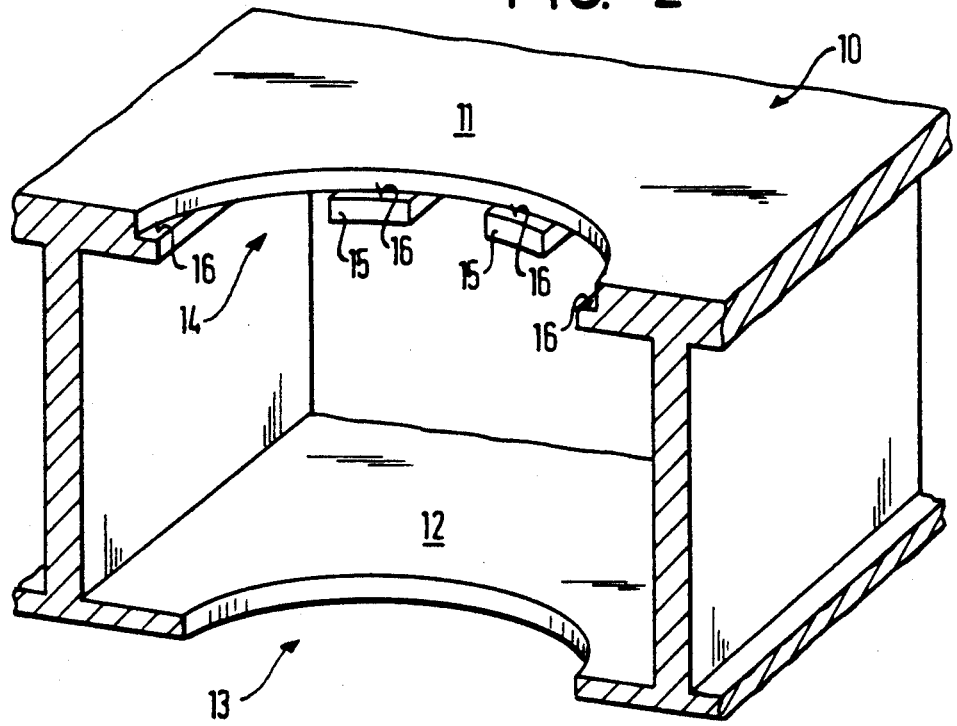
FIG. 2 is view similar to FIG. 1 in which an opening has been made in the supporting structure to receive the conveyor ball unit.
Figure 3:
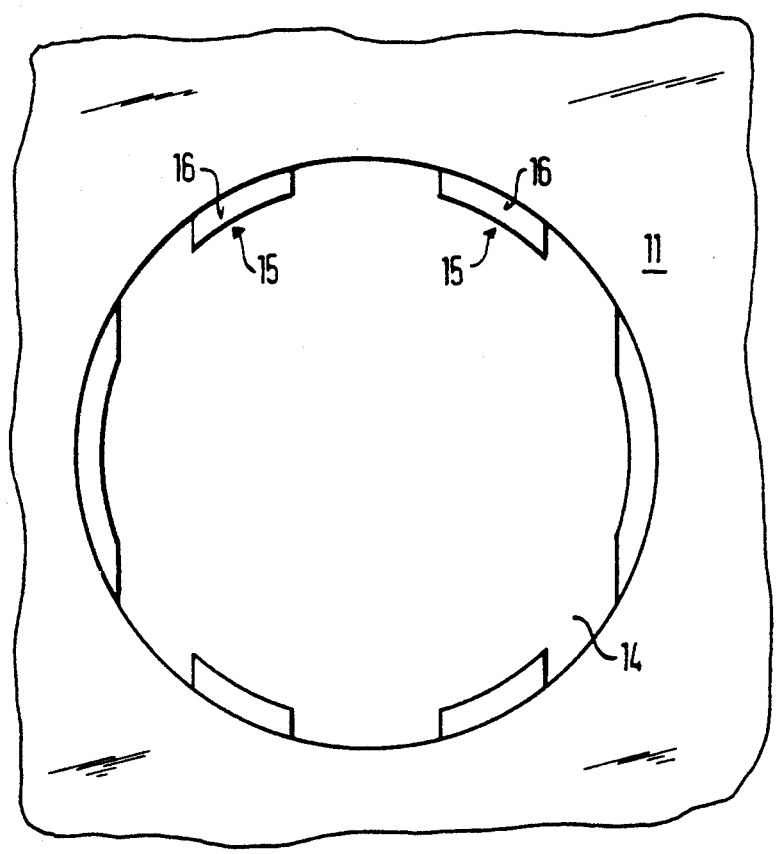
FIG. 3 is a plan view of the supporting structure shown in FIG. 2.

As shown in FIG. 1, a supporting structure 10 for a conveyor ball unit comprises an upper surface 11 connected to a lower surface 12 by vertical strips The upper surface 11 is provided with reinforcing ribs 15 on its underside. The supporting structure 10 is preferably manufactured as an extruded profile.

To install a conveyor ball unit in the supporting structure 10, a hole is first made through both the upper surface 11 and the lower surface 12 to produce an initially cylindrical upper opening 14 and a cylindrical lower opening 13.

The circumference of the upper part of the upper opening 14 is then expanded by milling, removing material to a depth that leaves the reinforcing ribs 15 essentially intact. Thus, the reinforcing ribs 15 form seating surfaces 16. The supporting structure 10 prepared in this way serves to receive all the embodiments of conveyor ball units subsequently described.

A first embodiment of a conveyor ball unit according to the invention will now be described with reference to FIGS. 4, 5 and 7.

This conveyor ball unit comprises a conveyor ball 21 rotatably mounted in a mounting shell 23 by means of a plurality of mounting balls 22. The rim 30 of the mounting shell 23 projects outward.

A retaining ring 24 is provided to hold the conveyor ball 21 on the mounting balls 22 within the mounting shell 23. The lower rim of the retaining ring 24 rests on the shell rim 30 and is turned around its edge as at 31.

Above the lower, outward-extending rim of the retaining ring 24 is an essentially cylindrical section, the upper edge 33 of which is bent inward toward the conveyor ball 21. The upper opening of the retaining ring 24 so formed has a diameter smaller than that of the conveyor ball 21, so that the latter cannot emerge upward through the retaining ring 24 but is securely held on the mounting balls 22.

The combination of the mounting shell 23 and the retaining ring 24 form a mounting unit 40 which is seated in a housing 20 having an annular cross section. The inner diameter of the housing 20 is somewhat larger than the outer diameter of the retaining ring 24 where its circumference is greatest, so that the mounting unit 40 can be shifted within the housing 20 along the central axis of the housing 20.

The upper rim of the housing 20 is bent inward to form a flange section 29 with a diameter smaller than that of the rest of the housing, so that upward movement of the mounting unit 40 is limited by contact with the flange section 29.

The lower edge 28 of the housing 20 is also bent inward, forming an end ring 32. In the transition region between the end ring 32 and a cylindrical outer wall 25 of the housing 20 there is an annular notch 38 that serves as a bracing surface, as described further below. Within he housing 20, abutting its end ring 32, is a spring support 27 with a substantially circular cross section. Seated on the spring support 27 is the lower end of a helical spring 26, the upper end of which contacts the turned rim 31 when the mounting unit 40 is in place. The spring is thus compressed, so that the spring tension presses the mounting unit 40 upward against the flange section 29 of the housing.

When installed, the housing 20 is positioned in the supporting structure 10 in such a way that the end ring 32 is seated in the lower opening 13 with the bracing surface 38 resting against the lower surface 12. In this way, because of their interlocking shapes, the housing 20 cannot slip sideways with respect to the lower opening 13.

The housing 20 is prevented from slipping sideways with respect to the upper opening 14, and from sliding upward out of the opening, by a holding device 34. Around the circumference of this device is a projecting rim 19, the underside of which forms a seating rim by way of which the holding device 34 bears on the seating surfaces 16.

Within the holding device 34 is a substantially cylindrical opening, the diameter of which is such that the cylindrical section of the retaining ring 24 can be displaced upward and downward in the holding device 34 but cannot move radially.

The holding device 34 is made of a resilient plastics material and at its circumference has two first locking elements 35, in the form of hemispherical lugs or the like. These first locking elements 35 are positioned at a height so that when the holding device 34 rests on the seating surfaces 16 by way of its seating rim 19, they extend below the reinforcing ribs 15. This arrangement is shown in FIG. 5. In a variation of this, the first locking elements 35, 35' are positioned in such a way that each fits into the gap between two reinforcing ribs 15, as shown in FIG. 4. However, the locking elements 35 make direct contact with the material of the upper surface 11 in this case as well.

Between the two locking elements 35 there is a slot 39 in the holding device 34, into which a tool such as the blade of a screwdriver can be inserted. The arrangement of the slot 39 with respect to the locking elements 35, 35' is symmetrical.

Diametrically opposite the slot 39 the holding device 34 is provided with a second tongue-shaped locking element 36, which can be inserted with a substantially tight fit between two reinforcing ribs 15.

To install the conveyor ball unit described above, the mounting unit 40 is first assembled. Then, while the upper edge of the housing 20 is still in line with the outer wall 25 of the housing, the mounting unit 40 is set into the housing 20 together with the spring 26 and spring support 27. Thereafter, the upper rim of the housing 20 is bent inward to form the flange section 29 of the housing.

The conveyor ball unit so formed can now be easily set into the openings 13 and 14 of a supporting structure 10 without any great skill being required. The holding device 34 is then placed on top in such a way that the second locking element 36 hooks into a gap between two reinforcing ribs 15. The opposite region of the holding device 34 can then be pushed down so that the first locking elements 35 are seated on the edge of the upper opening 14. Under further pressure the holding device 34 becomes deformed in the region of the first locking elements 35, so that the latter can slide down until they snap outward, keeping the holding device 34 firmly fixed in the upper opening 14. The result is that the housing 20, containing the mounting unit 40, is simultaneously centered and prevented from moving out of the supporting structure 10.

When a force with a vertical component, applied to the load-bearing conveyor ball 21, exceeds the tensile force in the spring 26 that results from compression during assembly of the conveyor ball unit, the mounting unit 40 is pressed downward into the housing 20, against the force exerted by the spring 26. Guidance in a vertical direction is ensured by the contact between the retaining ring 24 and the inner surface of the holding device 34.

To remove the housing 20, together with the mounting unit 40 it contains, the blade of a screwdriver is inserted into the slot 39 and the holding device 34 is levered out of the upper opening 14, the snap engagement of the first locking elements 35 being released by a process opposite to that described above for installation. After the holding device 34 has been removed, the housing 20 and the mounting unit 40 can be grasped and pulled up out of the opening. Like the installation, therefore, the dismantling of the unit is a matter of a few simple maneuvers.

In the second embodiment shown in partial cross-section in FIG. 6, the upper region of the housing 20 has the form of a cylindrical collar 41 extending upward from the flange section 29. The inner contour of the collar 41 is cylindrical. The retaining ring 24 can move longitudinally within this cylindrical part of the collar 41. This embodiment of the invention differs from the first as shown in FIG. 5 in that the only relative movement when the mounting unit 40 is pushed down is that between the mounting unit 40 and the housing 20.

Figure 10:
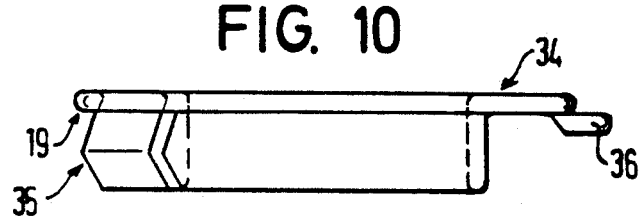
FIG. 10 is a side view of a holding device forming part of the embodiment shown in FIG. 9.
Figure 8:
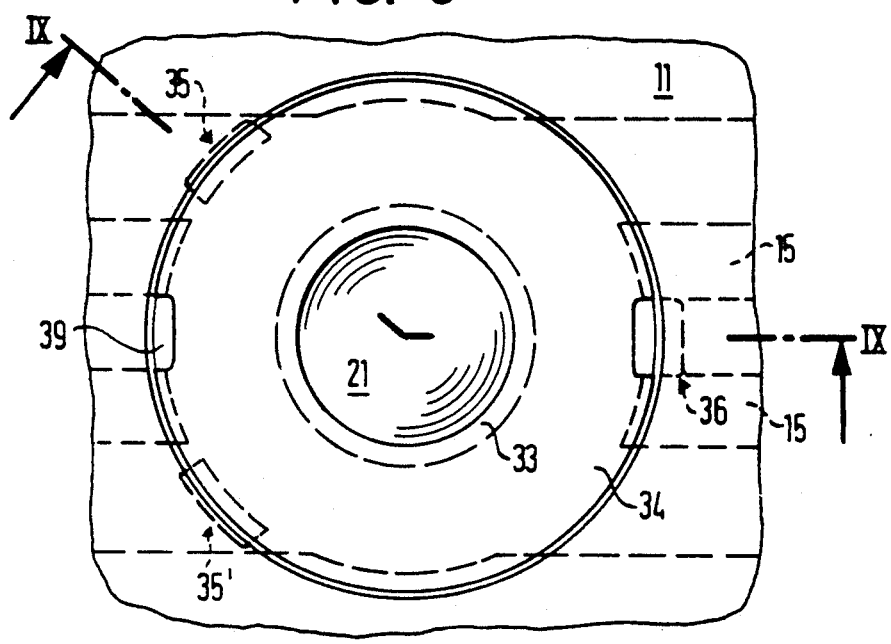
FIG. 8 is a view similar to FIG. 4 of a third embodiment of conveyor ball unit.
Figure 9:
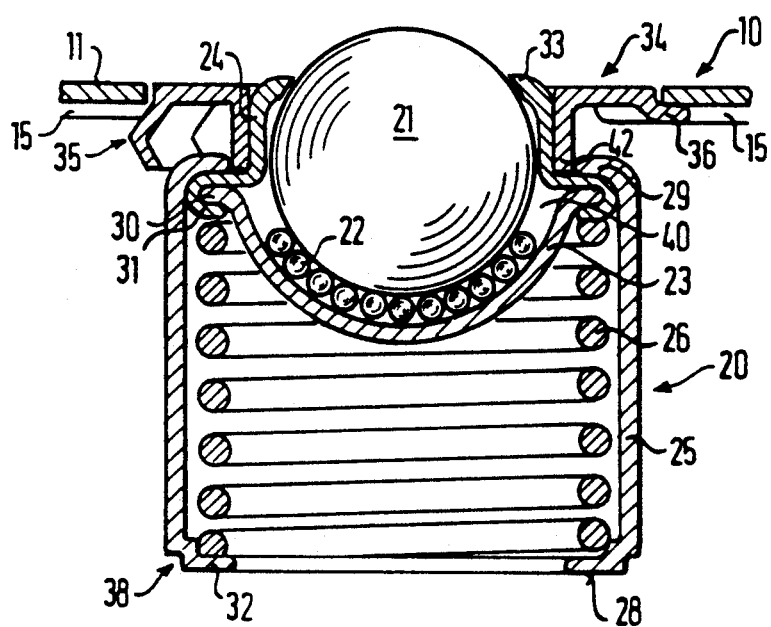
FIG. 9 is a sectional view along the line IX—IX in FIG. 8.

A third embodiment of the invention is shown in FIGS. 8 to 10. This differs from the first embodiment shown in FIGS. 4, 5 and 7 in the shape of the holding device 34. In this embodiment of the invention a lower edge 42 of the holding device 34 is seated in a space left open by the flange section 29 of the housing 20. With this arrangement the centering of the housing 20 by the holding device 34 is improved.

In addition, the first locking elements 35, 35' have a different cross-sectional shape than in the embodiments described previously. Here, the elements 35, 35' are not hemispherical but more Pointed in shape By giving them a suitable shape, the holding device 34 can, for example, be formed by being deep-drawn from a sufficiently ductile aluminum alloy.

What is claimed is:
1. A conveyor ball unit comprising
a conveyor ball;
a mounting shell for the conveyor ball
a plurality of mounting balls for supporting the conveyor ball in the mounting shell;
a retaining ring to keep the conveyor ball in position on the mounting balls within the mounting shell;
a spring arrangement to provide a resilient support for the mounting shell;
a housing for the spring arrangement;
a first holding means for bracing said housing against a force acting on the conveyor ball so that said housing remains substantially perpendicular to a surface of a supporting structure for the conveyor ball unit, said first holding means being located at a lower end of said housing opposite the conveyor ball;
at least one locking element to fix the conveyor ball unit in said supporting structure; and
a second holding means to secure an upper portion of said housing in an opening defined by said supporting structure so that the conveyor ball can protrude above the level of said second holding means and above said surface of said supporting structure, the second holding means defining an outer periphery larger than that of said housing and being constructed so that after said locking element has been released the second holding means can be removed from the unit as an independent element enabling said housing to be removed from said opening in said supporting structure.

2. A conveyor ball unit as claimed in claim 1, wherein said first holding means comprises a lower edge of said housing and defines a bracing surface to brace said housing against said supporting structure.

3. A conveyor ball unit as claimed in claim 2, wherein the bracing surface is shaped so as to be able to form a close fit against an edge of a lower opening defined by said supporting structure.

4. A conveyor ball unit as claimed in claim 1, wherein the second holding means defines an inner substantially circular aperture within which the conveyor ball is held in the mounting shell by the retaining ring, the conveyor ball being movable in said circular aperture in a direction perpendicular to said surface of said supporting structure whilst being guided by said second holding means.

5. A conveyor ball unit as claimed in claim 4, wherein the retaining ring defines an upper cylindrical portion, the outer diameter of which corresponds to the inner diameter of said inner aperture defined by the second holding means.

6. A conveyor ball unit as claimed in claim 1, said locking element comprises a resiliently deformable first locking element whereby said second holding means can be snap-fitted into said opening defined by said supporting structure.

7. A conveyor ball unit as claimed in claim 6, wherein the second holding means defines a slot near the first locking element into which a tool can be inserted to lever the second holding means out of said opening by releasing the snap engagement.

8. A conveyor ball unit as claimed in claim 7, wherein the second holding means comprises two first locking elements and said slot is located between them, a second locking element being provided diametrically opposite the slot at the other side of the conveyor ball and being shaped so that it can be firmly seated in said opening defined by said supporting structure.

9. A conveyor ball unit as claimed in claim 1, wherein the retaining ring and the mounting shell are each formed from sheet material and joined together to form a mounting unit.

10. A conveyor ball unit as claimed in claim 9, wherein the retaining ring and the mounting shell are joined together by a rim of the retaining ring being turned around a rim of the mounting shell.

11. A conveyor ball unit as claimed in claim 9, wherein the housing defines a substantially cylindrical interior space within which displacement of said mounting unit against the force of the spring arrangement is guided.

12. A conveyor ball unit as claimed in claim 11, wherein said interior space of the housing has regions of reduced diameter at both ends.

13. A conveyor ball unit as claimed in claim 1, wherein the housing is formed from a sheet material.

* * * * *